(12) United States Patent
Thomas et al.

(10) Patent No.: US 8,973,135 B2
(45) Date of Patent: Mar. 3, 2015

(54) SELECTIVELY SCANNING OBJECTS FOR INFECTION BY MALWARE

(75) Inventors: Anil Francis Thomas, Redmond, WA (US); Adrian M. Marinescu, Sammamish, WA (US); Ajith Kumar, Seattle, WA (US); Jonathan M. Keller, Redmond, WA (US); Omer Ben Bassat, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 13/248,867

(22) Filed: Sep. 29, 2011

(65) Prior Publication Data
US 2013/0086683 A1 Apr. 4, 2013

(51) Int. Cl.
G06F 12/14 (2006.01)
G06F 21/00 (2013.01)

(52) U.S. Cl.
CPC .................................... *G06F 21/00* (2013.01)
USPC .......................................................... 726/23

(58) Field of Classification Search
USPC ............................................... 726/22, 24, 25
See application file for complete search history.

(56) References Cited

U.S. PATENT DOCUMENTS

| | | | |
|---|---|---|---|
| 5,978,814 A | 11/1999 | Miller et al. | |
| 6,067,541 A | 5/2000 | Raju et al. | |
| 6,189,016 B1 | 2/2001 | Cabrera et al. | |
| 7,613,752 B2 | 11/2009 | Prahlad et al. | |
| 7,801,864 B2 | 9/2010 | Prahlad et al. | |
| 7,890,469 B1 | 2/2011 | Maionchi et al. | |
| 2005/0132206 A1* | 6/2005 | Palliyil et al. | 713/188 |
| 2006/0218637 A1* | 9/2006 | Thomas et al. | 726/23 |
| 2009/0089337 A1 | 4/2009 | Perlin et al. | |

OTHER PUBLICATIONS

Blacher, Zak, "Cluster-Slack Retention Characteristics: A Study of the NTFS File system", Retrieved at <<http://www.cs.kau.se/cs/education/courses/davddiss/Uppsatser_2010/D2010-06.pdf>>, Jun. 2010, pp. 89.

"Microsoft Reimagines Windows, Presents Windows 8 Developer Preview", Microsoft News Centre, Sep. 13, 2011, document available at: <http://www.microsoft.com/presspass/press/2011/sep11/09-13FutureofComputingPR.mspx>, retrieved on Oct. 1, 2011, 3 pages.

(Continued)

*Primary Examiner* — Ellen Tran
(74) *Attorney, Agent, or Firm* — Timothy Chuma; Kate Drakos; Micky Minhas

(57) ABSTRACT

Techniques are described herein that are capable of selectively scanning objects for infection by malware (i.e., to determine whether one or more of the objects are infected by malware). For instance, metadata that is associated with the objects may be reviewed to determine whether update(s) have been made with regard to the objects since a determination was made that the objects were not infected by malware. An update may involve increasing a number of the objects, modifying one of the objects, etc. Objects that have been updated (e.g., added and/or modified) since the determination may be scanned. Objects that have not been updated since the determination need not necessarily be scanned. For instance, an allowance may be made to perform operations with respect to the objects that have not been updated since the determination without first scanning the objects for infection by malware.

20 Claims, 6 Drawing Sheets

(56) References Cited

OTHER PUBLICATIONS

Nadella et al., "BUILD Keynote—Day 2", Microsoft News Centre, document available at: <http://www.microsoft.com/presspass/exec/nadella/09-14-11BUILD.mspx>, retrieved on Oct. 1, 2011, 24 pages.

Sinofsky et al., "Build Keynote—Day 1", Microsoft News Centre, document available at: <http://www.microsoft.com/presspass/exec/ssinofsky/2011/09-13BUILD.mspx>, retrieved on Oct. 1, 2011, 36 pages.

* cited by examiner

SELECTIVELY SCANNING OBJECTS FOR INFECTION BY MALWARE

BACKGROUND

Modern software programs often consume a substantial amount of time and/or resources (e.g., central processing unit (CPU) capabilities, input/output (PO capabilities, etc.) of machines on which the software programs execute. A variety of techniques have been proposed to reduce the amount of resources that software programs consume. However, each such technique has its limitations. For example, caching techniques has been developed that store content (or a reference to the content) in a local memory structure so that the content need not necessarily be read more than once. However, in accordance with such caching techniques, in order to determine whether such content has changed, the content typically is read. Thus, although caching techniques may serve to reduce the amount of resources consumed if the content is known to be unchanged, the benefit of such techniques is reduced when it is not known whether the content has changed. For instance, reading the content to determine whether the content has changed may consume substantial resources.

One type of software program that traditionally consumes a substantial amount of resources is an anti-malware program. Malware definitions (a.k.a. signatures) in anti-malware programs typically are updated relatively frequently, such as daily or multiple times per day, in an effort to protect against an ever-growing variety of malware. When an anti-malware program receives such an update, content traditionally is scanned even if the content has not changed so that a determination may be made as to whether one or more of the updated signatures match the content. Scanning the content upon each update of the signatures consumes substantial resources.

SUMMARY

Various approaches are described, herein for, among other things, selectively scanning objects for infection by malware (i.e., to determine whether one or more of the objects are infected by malware). For instance, metadata that is associated with the objects may be reviewed to determine whether update(s) have been made with regard to the objects since a determination was made that the objects were not infected by malware. Objects that have been updated since the determination may be scanned. Objects that have not been updated since the determination need not necessarily be scanned. For instance, an allowance may be made to perform operations with respect to the objects that have not been updated since the determination without first scanning the objects for infection by malware.

A method is described in which a determination is made that a plurality of objects is not infected by malware. A value of an update identifier in an update log that is associated with the plurality of objects is selected to be a reference value. The update identifier indicates a number of updates that occur with respect to the plurality of objects. For instance, an update may involve adding an object to the plurality of objects, modifying an object that is included in the plurality of objects, etc. The value of the update identifier is incremented for each update that occurs with respect to an object of the plurality of objects to provide a respective incremented value. For example, if an object is added to the plurality of objects, the value of the update identifier is incremented to provide an incremented value, which is said to be associated with that object. A determination is made that access to a designated object that is included in the plurality of objects is initiated. A determination is made that the incremented value that is associated with the designated object is greater than the reference value. Operations are allowed to be executed with respect to the designated object in absence of scanning the designated object for infection by malware.

A system is described that includes infection determination logic, selection logic, incrementing logic, access determination logic, comparison logic, and allowance logic. The infection determination logic is configured to determine whether a plurality of objects is infected by malware. The selection logic is configured to select a value of an update identifier in an update log that is associated with the plurality of objects to be a reference value in response to a determination that the plurality of objects is not infected by malware. The update identifier indicates a number of updates that occur with respect to the plurality of objects. The incrementing logic is configured to increment the value of the update identifier for each update that occurs with respect to an object of the plurality of objects to provide a respective incremented value. The access determination logic is configured to determine whether access to a designated object that is included in the plurality of objects is initiated. The comparison logic is configured to determine whether the incremented value that is associated with the designated object is greater than the reference value. The allowance logic is configured to allow operations to be executed with respect to the designated object in absence of scanning the designated object for infection by malware in response to a determination that access to the designated object is initiated and further in response to a determination that the incremental value that is associated with the designated object is not greater than the reference value.

A computer program product is described that includes a computer-readable medium having computer program logic recorded thereon for enabling a processor-based system to selectively scan objects based on metadata. The computer program product includes first, second, third, fourth, fifth, and sixth program logic modules. The first program logic module is for enabling the processor-based system to determine whether a plurality of objects is infected by malware. The second program logic module is for enabling the processor-based system to select a value of an update identifier in an update log that is associated with the plurality of objects to be a reference value in response to a determination that the plurality of objects is not infected by malware. The update identifier indicates a number of updates that occur with respect to the plurality of objects. The third program logic module is for enabling the processor-based system to increment the value of the update identifier for each update that occurs with respect to an object of the plurality of objects to provide a respective incremented value. The fourth program logic module is for enabling the processor-based system to determine whether access to a designated object that is included in the plurality of objects is initiated. The fifth program logic module is for enabling the processor-based system to determine whether the incremented value that is associated with the designated object is greater than the reference value. The sixth program logic module is for enabling the processor-based system to allow operations to be executed with respect to the designated object in absence of scanning the designated object for infection by malware in response to a determination that access to the designated object is initiated and further in response to a determination that the incremental value that is associated with the designated object is not greater than the reference value This Summary is provided to introduce a selection of concepts in a simplified form that are further described below in the Detailed Description. This Summary is not intended to identify key features or essential features of the claimed subject matter, nor is it intended, to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 depicts an example computer in which embodiments may be implemented.

Figure 1:
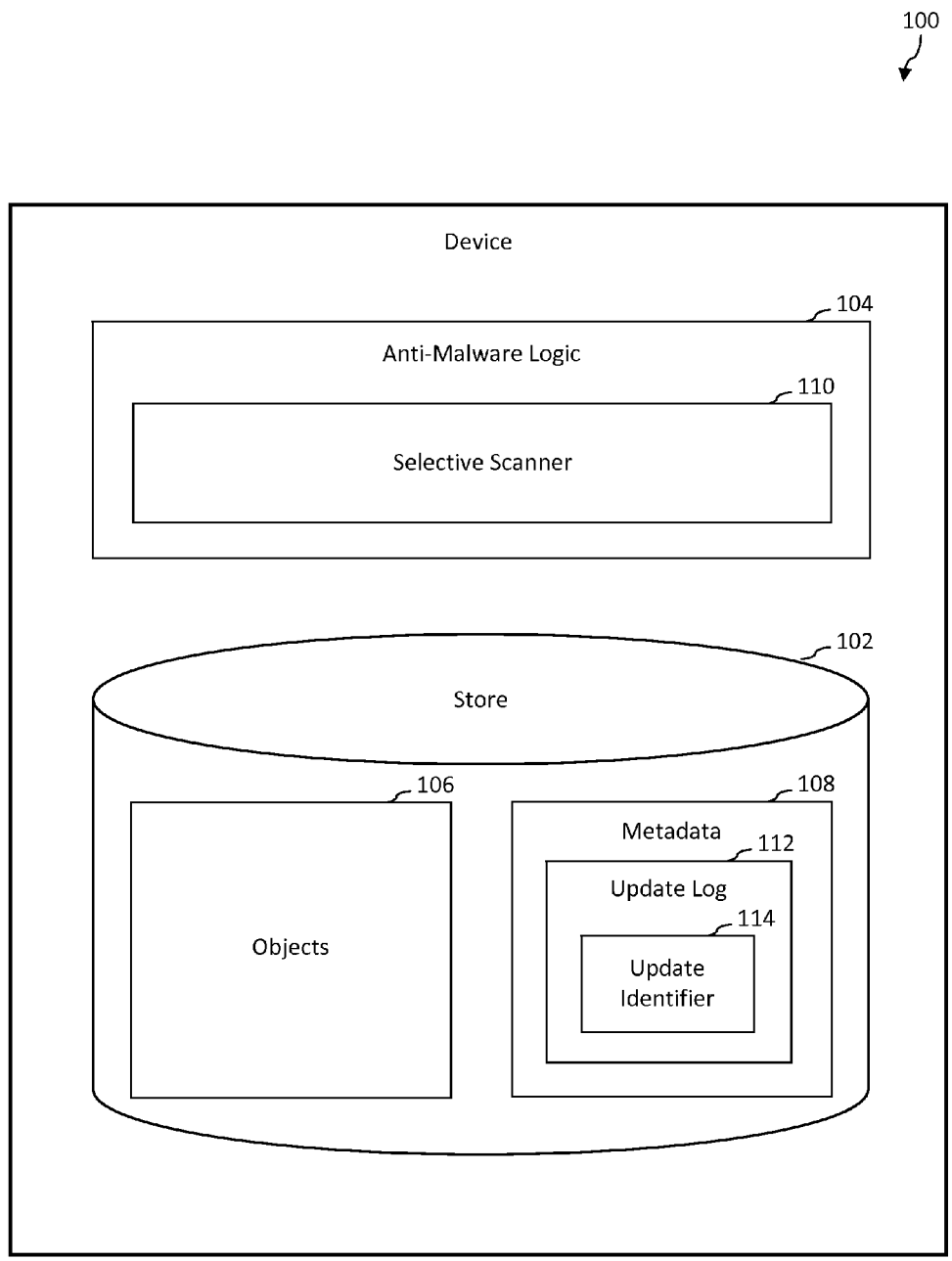
FIG. 1 is a block diagram of an example device in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of selectively scanning objects for infection by malware (i.e., to determine whether one or more of the objects are infected by malware). For instance, metadata that is associated with the objects may be reviewed to determine whether update(s) have been made with regard to the objects since a determination was made that the objects were not infected by malware. An update may involve increasing a number of the objects, modifying one of the objects, etc. Objects that have been updated (e.g., added and/or modified) since the determination may be scanned. Objects that have not been updated since the determination need not necessarily be scanned. For instance, an allowance may be made to perform operations with respect to the objects that have not been updated since the determination without first scanning the objects for infection by malware.

Example techniques described herein have a variety of benefits as compared to conventional techniques for scanning objects. The example techniques may consume less time and/or fewer resources than the conventional techniques. For instance, if an object is unchanged since a determination that the object is not infected by malware, the object need not be scanned for infection by malware before operations are performed with respect to the object, even if malware signature update(s) are received. The example techniques may scan objects that have been updated since such a determination but not objects that have not been updated since the determination. The example techniques may be capable of reviewing metadata associated with the objects to determine whether the objects are to be scanned. For instance, the metadata may be reviewed in lieu of the content of the objects. The example techniques may be capable of determining that a plurality of objects (or a subset thereof), such as a virtual base image, is to be trusted, as not including (or being modified by) malware. The determination that the plurality of objects is to be trusted may be based on a single, highest incremental value that is assigned among the plurality of objects. The plurality of objects may constitute all objects on one or more volumes of a store, for example. The example techniques may be used to avoid scanning objects on a clean operating system (OS) installation, on a clean image that is created by an original equipment manufacturer (OEM) or an information technology (IT) administrator, etc. For example, such an image may be run by a host and may include a variety of files, including but not limited to operating system files, application files, etc. In another example, such an image may be used to install software program(s) on each of a plurality of machines.

FIG. 1 is a block diagram of an example device 100 in accordance with an embodiment. Device 100 is a processing system that is capable of selectively scanning objects for infection by malware. An example of a processing system is a system that includes at least one processor that is capable of manipulating data in accordance with a set of instructions. For instance, a processing system may be a computer (e.g., a desktop computer, a laptop computer, a tablet computer, etc.), a personal digital assistant, a cellular telephone, etc. Although device 100 is described herein as being a processing system, it will be recognized that device 100 may be implemented as a virtual machine.

Device 100 includes store 102 and anti-malware logic 104. Store 102 stores objects 106 and metadata 108 that is associated with the objects 106. Examples of an object include but are not limited to a file, a registry key, a database object, or any other suitable type of object. Metadata 108 may include any suitable information regarding the objects. Metadata 108 is shown in FIG. 1 to include an update log 112. The update log 112 includes information that indicates an order with which the objects 106 are updated. The update log 112 includes an update identifier 114, which indicates a number of updates that have occurred with respect to the objects 106.

For purposes of illustration, assume that object A is added to the objects 106, and then object 13, which is already included in the objects 106, is modified. When object A is added to the objects 106, a value of the update identifier 114 may be incremented to be 456,789 (e.g., if the value of the update identifier 114 was previously 456,788). Thereafter, when object B is modified, the value of the update identifier 114 may be incremented to be 456,790. The update log 112 is revised to indicate that object A corresponds to the 456,789th update to the objects 106 and that object B corresponds to the 456,790th update to the objects 106. The update identifier 114 maintains the value of 456,790, thereby indicating that 456,790 updates have been made to the objects 106, until another update is made to the objects 106. For instance, if object A is thereafter modified, the update log 112 is revised to indicate that object A corresponds to the 456,791st update to the objects 106 (rather than the 456,789th update), and the value of the update identifier 114 is incremented to be 456,791 to indicate that 456,791 updates have been made to the objects 106.

The example values mentioned above are provided for illustrative purposes only and are not intended to be limiting. It will be recognized that the update log 112 may include any suitable values, and the update identifier 114 may have any suitable value. Moreover, such values are described as being incremented by one each time an update is made to the objects 106 for illustrative purposes and is not intended to be limiting. It will be recognized that any suitable amount of increment (1, 2, 3, etc.), whether fixed or variable, may be used to increment such values. For instance, the amount of any one or more increments may be determined in accordance with arbitrary transformation function(s). Furthermore, the update identifier 114 need not necessarily indicate an exact count of the number of updates that have occurred with respect to the objects 106. For example, one or more of the objects 106 may have been created before creation and/or initialization of the update identifier 114. In accordance with this example, the update identifier 114 may be initialized during a setup operation that occurs after one or more of the objects 106 are created.

Store 102 may be any suitable type of store. One type of store is a database. For instance, store 102 may be a relational database, an entity-relationship database, an object database, an object relational database, an extensible markup language (XML) database, etc. Store 102 is shown in FIG. 1 to be included in a single device for illustrative purses and is not intended to be limiting. It will be recognized that store 102 may be distributed across multiple devices.

Anti-malware logic 104 is configured to determine whether the objects 106 are infected by malware. An object is said to be infected by malware when the object includes the malware and/or is modified by the malware. Anti-malware logic 104 may be further configured to remove an effect of such malware from the objects 106. Removing an effect of malware from an object may include removing changes that were made to the object by the malware, removing the malware from the object, etc. Removing an effect of malware from an object is referred to herein as disinfecting the object.

Anti-malware logic 104 includes selective scanner 110. Selective scanner 110 is configured to selectively scan the objects 106 for infection by malware. For example, selective scanner 110 may review the metadata 108 to determine whether one or more of the objects 106 are to be scanned. To this end, selective scanner 110 may determine a reference value in the update log 112 corresponding to a time instance at which the objects are deemed to be not infected by malware. Accordingly, it may be presumed that objects corresponding to values in the updated log 112 that are equal to or less than the reference value are not infected by malware. In accordance with this example, selective scanner 110 may compare the reference value to a value that corresponds to a specified object that is included in the objects 106. If the value that corresponds to the specified object is greater than the reference value, selective scanner 110 may determine that the specified object is to be scanned for infection by malware because it is unknown whether the specified object is infected by malware. For instance, selective scanner 110 may determine that the specified object is to be scanned before designated operations are allowed to be performed with respect to the specified object. However, if the value that corresponds to the specified object is not greater than the reference value, selective scanner 110 may allow the designated operations to be performed with respect to the specified object without first scanning the designated object for infection by malware. Some example techniques for selectively scanning objects for infection by malware are described below with reference to FIGS. 2 and 3.

Selective scanner 110 may be implemented in various ways to selectively scan objects for infection by malware, including being implemented in hardware, software, firmware, or any combination thereof. For example, selective scanner 110 may be implemented as computer program code configured to be executed in one or more processors. In another example, selective scanner 110 may be implemented as hardware logic/electrical circuitry. In an embodiment, selective scanner 110 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2A:
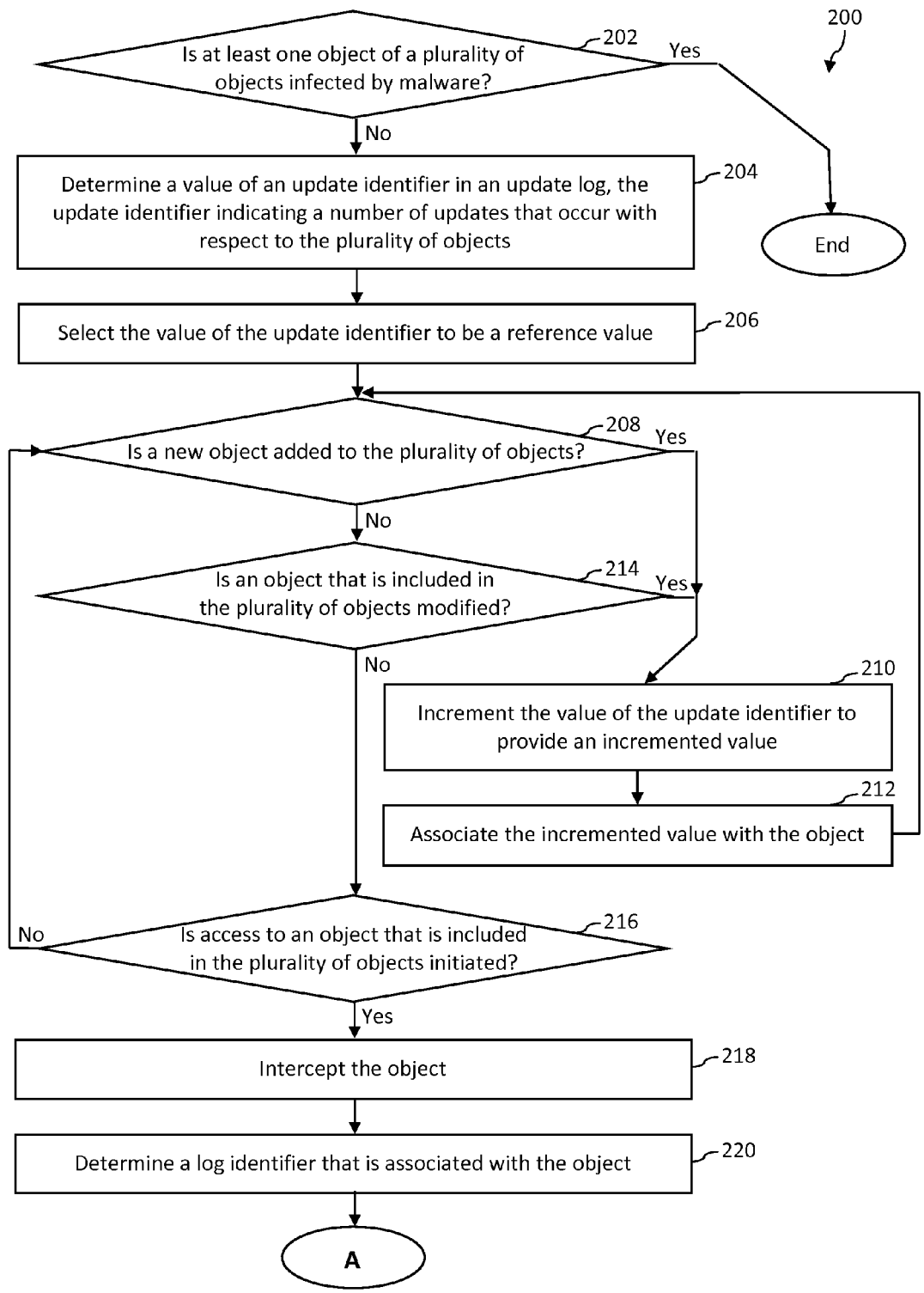
FIGS. 2A and 2B depict respective portions of a flowchart of an example method for selectively scanning objects for infection by malware in accordance with an embodiment.
Figure 2B:
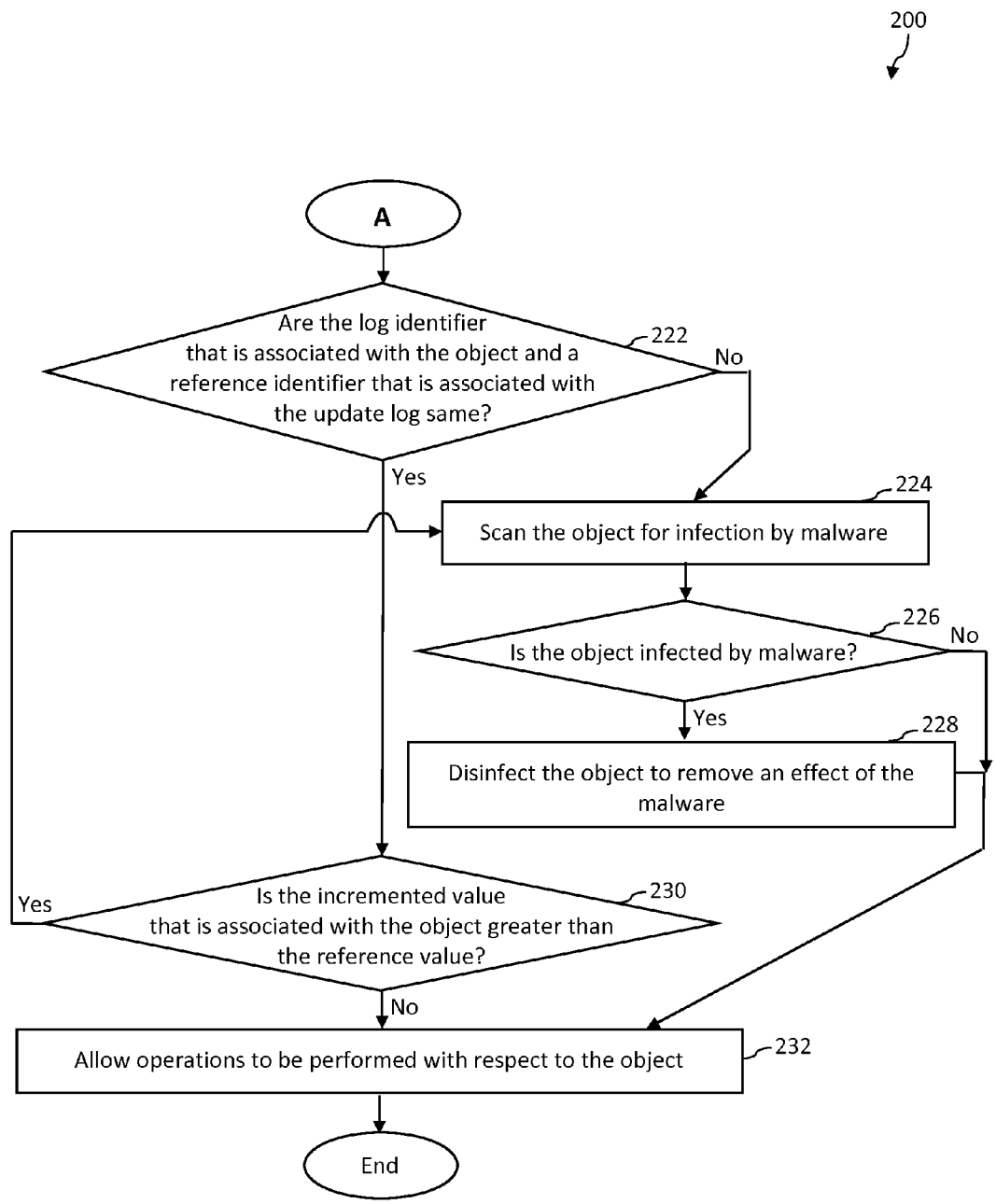
Figure 3:
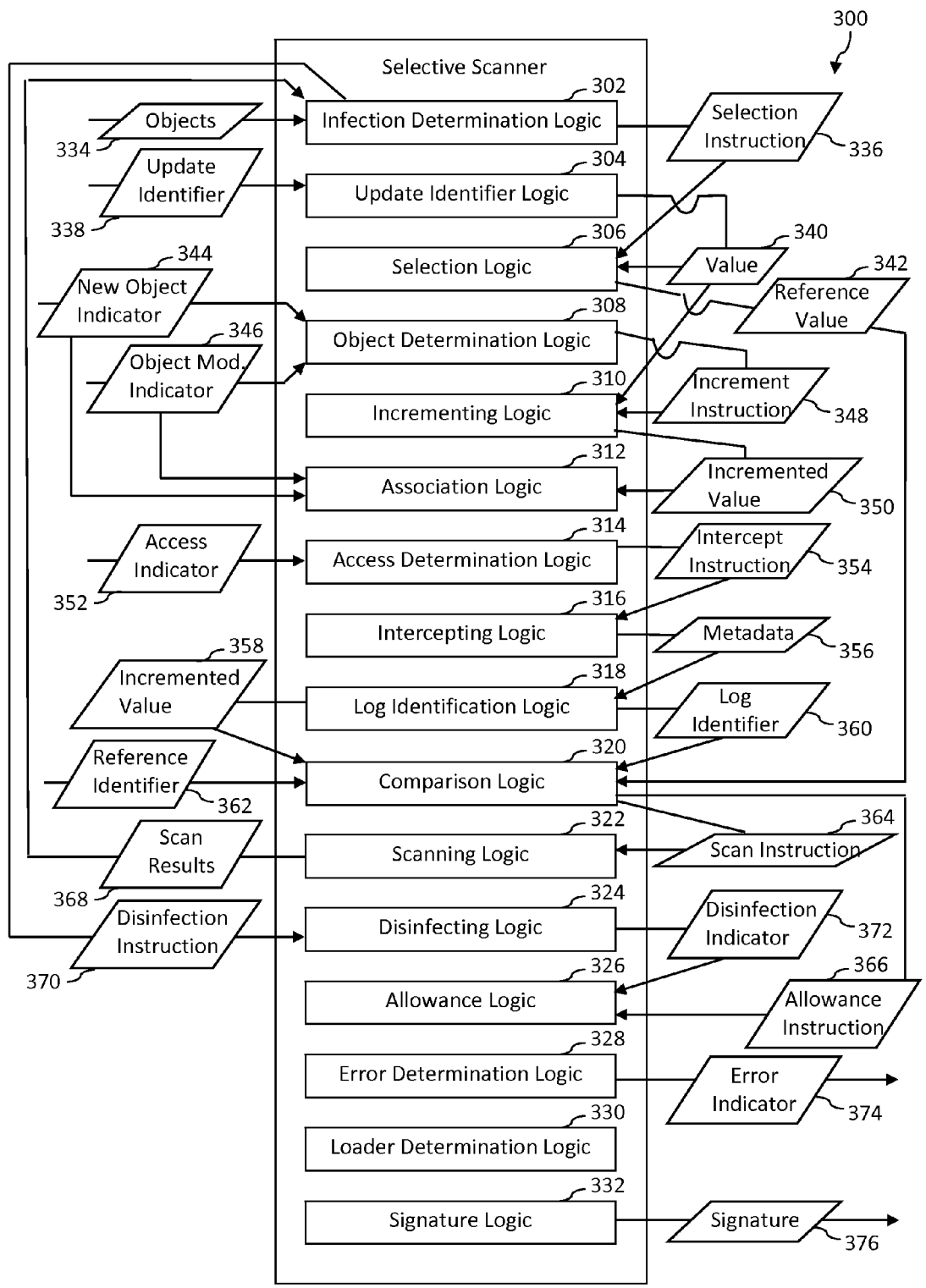
FIG. 3 is a block diagram of an example implementation of a selective scanner shown in FIG. 1 in accordance with an embodiment.
Figure 5:
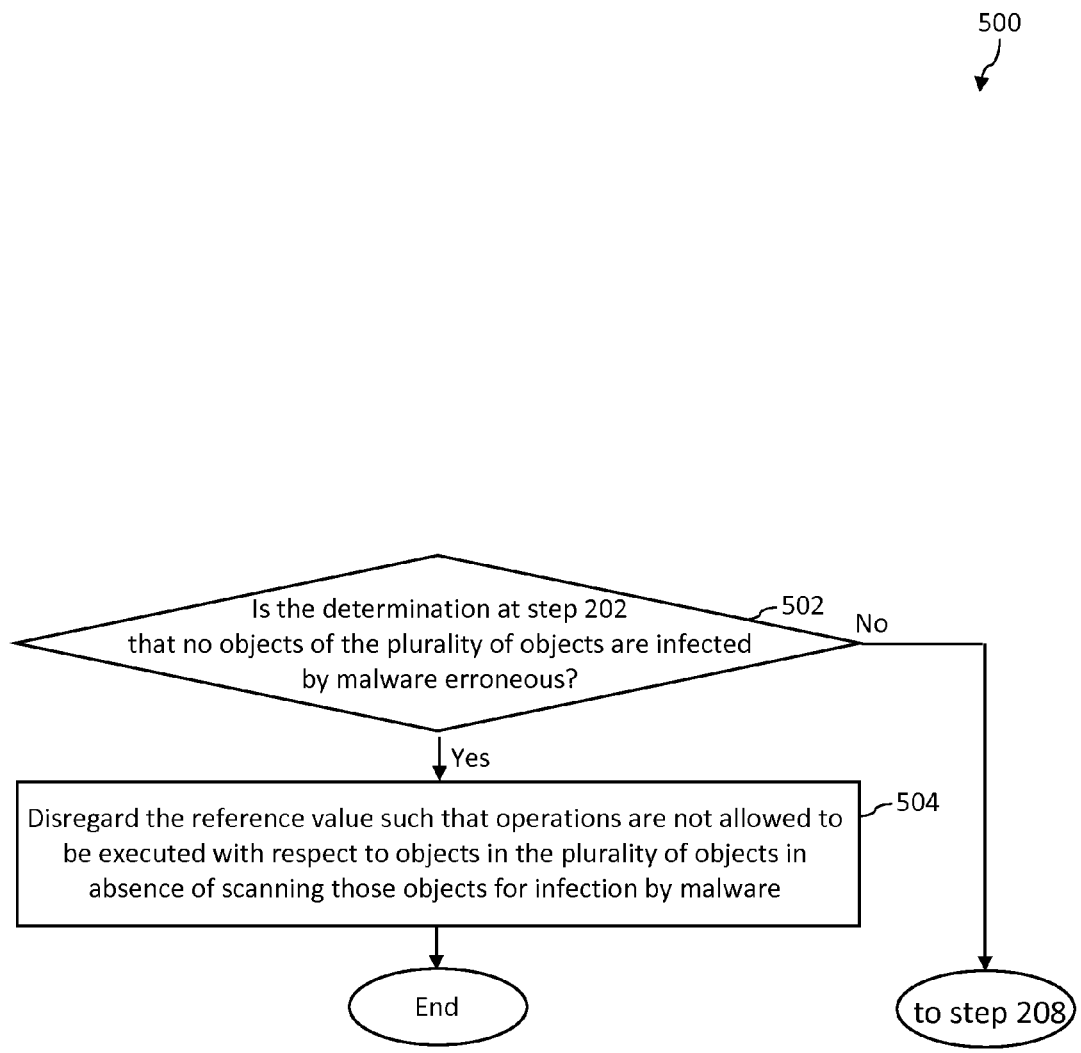
FIG. 5 depicts a flowchart of another example method for selectively scanning objects for infection by malware in accordance with an embodiment.

FIGS. 2A and 2B depict respective portions of a flowchart 200 of an example method for selectively scanning Objects for infection by malware in accordance with an embodiment. FIG. 5 depicts a flowchart 500 of another example method for selectively scanning objects for infection by malware in accordance with an embodiment. Flowcharts 200 and 500 may be performed h selective scanner 110 of device 100 shown in FIG. 1, for example. For illustrative purposes, flowcharts 200 and 500 are described with respect to a selective scanner 300 shown in FIG. 3, which is an example of a selective scanner 110, according to an embodiment. As shown in FIG. 3, selective scanner 300 includes infection determination logic 302, update identifier logic 304, selection logic 306, object determination logic 308, incrementing logic 310, association logic 312, access determination logic 314, intercepting logic 316, log identification logic 318, comparison logic 320, scanning logic 322, disinfecting logic 321, allowance logic 326, error determination logic 328, loader determination logic 330, and signature logic 332. Further structural and operational embodiments will be apparent to persons skilled in the relevant art(s) based on the discussion regarding flowcharts 200 and 500.

As shown in FIG. 2A, the method of flowchart 200 begins at step 202. In step 202, a determination is made whether at least one object of a plurality of objects is infected by malware. A variety of techniques for detecting malware are well-known to persons skilled in the relevant art(s). Any such techniques and/or others may be used to determine whether at least one object of the plurality of objects is infected by malware. In an example, the determination may be made in response to an initial login by a user to a machine on which the plurality of objects is stored. In another example, the determination may be made in response to creation of an image (e.g., a virtual base image) that includes the plurality of objects. The plurality of objects may be on one or more specified volumes of a memory, though the scope of the example embodiments is not limited in this respect. The plurality of objects may include all objects that are included on a system, on one or more volumes, or on an image, though the scope of the example embodiments is not limited in this respect. If at least one object of the plurality of objects is infected by malware, flowchart 200 ends. Otherwise, flow continues to step 204. In an example implementation, infection determination logic 302 determines whether at least one of objects 334 is infected by malware. Infection determination logic 302 may provide selection instruction 336 to selection logic 306 in response to determining that none of the objects 334 is infected by malware.

At step 204, a value of an update identifier in an update log is determined. The update identifier indicates a number of updates that occur with respect to the plurality of objects. For instance, the updated identifier may be an update sequence number (USN), though the scope of the example embodiments is not limited in this respect. Examples of an update log include but are not limited to a new technology file system (NTFS) log, a high performance file system (HPFS) log, a VERITAS™ file system log, a Google® file system log, a global file system (GFS) log, a general parallel file system (GPFS) log, a hierarchical file system (HFS) Plus log, etc. In an example implementation, update identifier logic 304 determines a value 340 of update identifier 338. The update identifier 338 indicates a number of updates that occur with respect to the objects 334.

At step 206, the value of the update identifier is selected to be a reference value. In an example implementation, selection logic 306 selects the value 340 of the update identifier 338 to be a reference value 342. In accordance with this implementation, selection logic 306 may select the value 340 of the update identifier 338 to be the reference value 342 in response to receiving the selection instruction 336 from infection determination logic 302. For instance, the selection instruction 336 may indicate that the value 340 of the update identifier 338 is to be selected as the reference value 342.

At step 208, a determination is made whether a new object is added to the plurality of objects. If a new object is added to the plurality of objects, flow continues to step 210. Otherwise, flow continues to step 214. In an example implementation, object determination logic 308 determines whether a new object is added to the objects 334. For example, object determination logic 308 may determine that a new object is added to the objects 334 based on receipt of a new object indicator 344, which indicates that a new object has been added to the objects 334. In accordance with this example, object determination logic 308 may provide increment instruction 348 to incrementing logic 310 in response to determining that a new object is added to the objects 334.

At step 210, the value of the update identifier is incremented to provide an incremented value. The value of the updated identifier may be incremented by a fixed amount or a variable amount, a predetermined amount or a non-predetermined amount, etc. For instance, the value of the update identifier may be incremented in accordance with an arbitrary transformation function to provide the incremented value. Such a transformation function may be a linear function, a non-linear function, or other suitable type of function. In an example implementation, incrementing logic 310 increments the value 340 of the update identifier 338 to provide an incremented value 350. For instance, incrementing logic 310 may increment the value 340 in response to receiving increment instruction 348 from object determination logic 308.

At step 212, the incremented value is associated with the object. Upon completion of step 212, flow returns to step 208. In an example implementation, association logic 312 associates the incremented value 350 with the object.

At step 214, a determination is made whether an object that is included in the plurality of objects is modified. For instance, one or more modifications may have been made to an object that is included in the plurality of objects since a determination was made at step 202 that the plurality of objects was not infected by malware. If an object that is included in the plurality of objects is modified, flow continues to step 210. Otherwise, flow continues to step 216. In an example implementation, object determination logic 308 determines whether an object that is included in the objects 334 is modified. For example, object determination logic 308 may determine that an object that is included in the objects 334 is modified based on receipt of an object modification indicator 346, which indicates that an object that is included in the objects 334 has been modified. In accordance with this example, object determination logic 308 may provide increment instruction 348 to incrementing logic 310 in response to determining that an object that is included in the objects 334 is modified.

At step 216, a determination is made Whether access to an object that is included in the plurality of objects is initiated. For example, a determination may be made that access to an object is initiated in response to receiving a request or instruction to read, save, and/or open the object. In accordance with this example, it may be determined that an attempt is made to read, save, and/or open the object based on receipt of such a request or instruction. For instance, access to an object may be initiated by a user or a software program. If access to an object that is included in the plurality of objects is initiated, flow continues to step 218. Otherwise, flow returns to step 208. In an example implementation, access determination logic 314 determines whether access to an object that is included in the objects 334 is initiated. For example, access determination logic 314 may determine that access to an object that is included in the objects 334 is initiated based on receipt of an access indicator 352, which indicates that access to an object that is included in the objects 334 is initiated. In accordance with this example, access determination logic 314 may provide intercept instruction 354 to intercepting logic 316 in response to determining that access to an object that is included in the objects 334 is initiated.

At step 218, the object is intercepted. In an example implementation, intercepting logic 316 intercepts the object. For example, intercepting logic 316 may intercept the object in response to receiving the intercept instruction 354 from access determination logic 314. In accordance with this example, the intercept instruction 354 may indicate that the object is to be intercepted.

At step 220, a log identifier is determined that is associated with the object. Upon completion of step 220, flow continues to step 222, which is shown in FIG. 2B. In an example implementation, log identification logic 318 determines a log identifier 360 that is associated with the object. For instance, the log identification logic 318 may be included in metadata 356 that is associated with the object.

At step 222, a determination is made whether the log identifier that is associated with the object and a reference identifier that is associated with the update log are same. If the log identifier that is associated with the object and the reference identifier are the same, flow continues to step 230. Otherwise flow continues to step 224. In an example implementation, comparison logic 320 determines whether the log identifier 360 and a reference identifier 362 that is associated with the update log are the same. Comparison logic 320 may be configured to provide a scan instruction 364 to scanning logic 322 in response to a determination that the log identifier 360 and the reference identifier 362 are not the same.

At step 224, the object is scanned for infection by malware. In an example implementation, scanning logic 322 scans the object for infection by malware. For instance, scanning logic 322 may scan the object for infection by malware based on receipt of the scan instruction 364 from comparison logic 320. Scanning logic 322 may provide scan results 368 to infection determination logic 302 for further processing in response to scanning the object.

At step 226, a determination is made whether the object is infected by malware. If the object is infected by malware, flow continues to step 228. Otherwise, flow continues to step 232. In an example implementation, infection determination logic 302 determines whether the object is infected by malware. For instance, infection determination logic 302 may determine whether the object is infected by malware based on the scan results 368 that are received from scanning logic 322. Infection determination logic 302 may provide a disinfection instruction 370 to disinfecting logic 324 in response to a determination that the object is infected by malware. The disinfecting instruction 370 may indicate that the object is to be disinfected.

At step 228, the object is disinfected to remove an effect of the malware. In an example implementation, disinfecting logic 324 disinfects the object to remove the effect of the malware. For instance, disinfecting logic 324 may disinfect the object in response to receiving the disinfection instruction 370 from infection determination logic 302. Disinfecting logic 324 may provide disinfection indicator 372 to allowance logic 326 in response to disinfecting the object. The disinfection indicator 372 may indicate that the object has been disinfected.

At step 230, a determination is made whether the incremented value that is associated with the object is greater than the reference value. If the incremented value that is associated with the object is greater than the reference value, flow returns to step 224. Otherwise, flow continues to step 232. In an example implementation, comparison logic 320 determines whether the incremented value 358 that is associated with the object is greater than the reference value 342. In accordance with this implementation, the incremented value 358 may be included in the metadata 356 that is associated with the object. Comparison logic 320 may be configured to provide the scan instruction 364 to scanning logic 322 in response to a determination that the incremented value 358 is greater than the reference value 342. Comparison logic 320 may be configured to provide an allowance instruction 366 to allowance logic 326 in response to a determination that the incremented value 358 is not greater than the reference value 342. The allowance instruction 366 may indicate that operations are to be allowed to be performed with respect to the object.

At step 232, operations are allowed to be performed with respect to the object. For instance, an allowance may be made for the object to be accessed (e.g., read, opened, and/or saved), modified, processed, executed, etc. In an example implementation, allowance logic 326 allows operations to be performed with respect to the object. For instance, allowance logic 326 may allow operations to be performed with respect to the object based on receipt of the disinfection indicator 372 and/or the allowance instruction 366.

In some example embodiments, one or more steps 202, 204, 206, 208, 210, 212, 214, 216, 218, 220, 222, 224, 226, 228, 230, and/or 232 of flowchart 200 may not be performed. Moreover, steps in addition to or in lieu of steps 202, 204, 206, 208, 210, 212, 214, 216, 218, 220, 222, 224, 226, 228, 230, and/or 232 may be performed. For example, it will be recognized that steps 221, 226, and 228 need not necessarily be performed. In accordance with this example, access to the object may be denied, or the object may be further processed to determine whether access to the object is to be denied, in lieu of performing steps 224, 226, and 228.

The method of flowchart 500 may begin upon completion of the steps shown in flowchart 200 of FIG. 2, though the scope of the example embodiments is not limited in this respect. For instance, the method of flowchart 500 may be triggered by an instruction to perform periodic validation (e.g., scanning of all objects in the plurality of objects) or by an instruction to perform a signature update with respect to one or more objects in the plurality of objects.

As shown in FIG. 5, the method of flowchart 500 begins at step 502. In step 502, a determination is made whether a determination at step 202 (see flowchart 200) that no objects of the plurality of objects are infected by malware is erroneous. If the determination at step 202 is erroneous, flow continues to step 504. Otherwise, flow continues to step 208 (see flowchart 200). In an example implementation, error determination logic 328 determines whether the determination at step 202 is erroneous. For instance, error determination logic 328 may be configured to provide an error indicator 374 to comparison logic 320 in response to a determination that the determination at step 202 is erroneous.

At step 504, the reference value is disregarded such that operations are not allowed to be executed with respect to objects in the plurality of objects in absence of scanning those objects for infection by malware. In an example implementation, comparison logic 320 disregards the reference value 342. For instance, comparison logic 320 may provide scan instruction 364 to scanning logic 322 and/or not provide allowance instruction 366 to allowance logic in response to receipt of the error indicator 374 from error determination logic 328.

In some example embodiments, one or more steps 502 and/or 504 of flowchart 500 may not be performed. Moreover, steps in addition to or in lieu of steps 502 and/or 504 may be performed. For example, in addition to or in lieu of performing step 504, the following steps may be performed. First, a determination may be made that an object loader, such as an original equipment manufacturer or an anti-malware vendor, loads the plurality of objects on a machine. Second, a signature regarding the plurality of objects may be generated that indicates that operations are not to be allowed on instances of the plurality of objects that are loaded on machines by the object loader in absence of scanning the instances for infection by malware. In an example implementation, loader determination logic 330 determines that an object loader loads the objects 334 in store 102 of FIG. 1. In accordance with this implementation, signature logic 332 generates a signature 376 regarding the objects 334 that indicates that operations are not to be allowed on instances of the objects 334 that are loaded on machines by the object loader in absence of scanning the instances for infection by malware.

It will be recognized that selective scanner 300 may not include one or more of infection determination logic 302, update identifier logic 304, selection logic 306, object determination logic 308, incrementing logic 310, association logic 312, access determination logic 314, intercepting logic 316, log identification logic 318, comparison logic 320, scanning logic 322, disinfecting logic 324, allowance logic 326, error determination logic 328, loader determination logic 330, and/or signature logic 332. Furthermore, selective scanner 300 may include modules in addition to or in lieu of infection determination logic 302, update identifier logic 304, selection logic 306, object determination logic 308, incrementing logic 310, association logic 312, access determination logic 314, intercepting logic 316, log identification logic 318, comparison logic 320, scanning logic 322, disinfecting logic 324, allowance logic 326, error determination logic 328, loader determination logic 330, and/or signature logic 332.

Anti-malware logic 104, selective scanner 110, infection determination logic 302, update identifier logic 304, selection logic 306, object determination logic 308, incrementing logic 310, association logic 312, access determination logic 314, intercepting logic 316, log identification logic 318, comparison logic 320, scanning logic 322, disinfecting logic 324, allowance logic 326, error determination logic 328, loader determination logic 330, signature logic 332, flowchart 200, and flowchart 500 may be implemented in hardware, software, firmware, or any combination thereof.

For example, anti-malware logic 104, selective scanner 110, infection determination logic 302, update identifier logic 304, selection logic 306, object determination logic 308, incrementing logic 310, association logic 312, access determination logic 314, intercepting logic 316, log identification logic 318, comparison logic 320, scanning logic 322, disinfecting logic 324, allowance logic 326, error determination logic 328, loader determination logic 330, signature logic 332, flowchart 200, and/or flowchart 500 may be implemented as computer program code configured to be executed in one or more processors.

In another example, anti-malware logic 104, selective scanner 110, infection determination logic 302, update identifier logic 304, selection logic 306, object determination logic 308, incrementing logic 310, association logic 312, access determination logic 314, intercepting logic 316, log identification logic 318, comparison logic 320, scanning logic 322, disinfecting logic 324, allowance logic 326, error determination logic 328, loader determination logic 330, signature logic 332, flowchart 200, and/or flowchart 500 may be implemented as hardware logic/electrical circuitry. For instance, in an embodiment, one or more of anti-malware logic 104, selective scanner 110, infection determination logic 302, update identifier logic 304, selection logic 306, object determination logic 308, incrementing logic 310, association logic 312, access determination logic 314, intercepting logic 316, log identification logic 318, comparison logic 320, scanning logic 322, disinfecting logic 324, allowance logic 326, error determination logic 328, loader determination logic 330, signature logic 332, flowchart 200, and/or flowchart 500 may be implemented in a system-on-chip (SoC). The SoC may include an integrated circuit chip that includes one or more of a processor (e.g., u microcontroller, microprocessor, digital signal processor (DSP), etc.), memory, one or more communication interfaces, and/or further circuits and/or embedded firmware to perform its functions.

Figure 4:
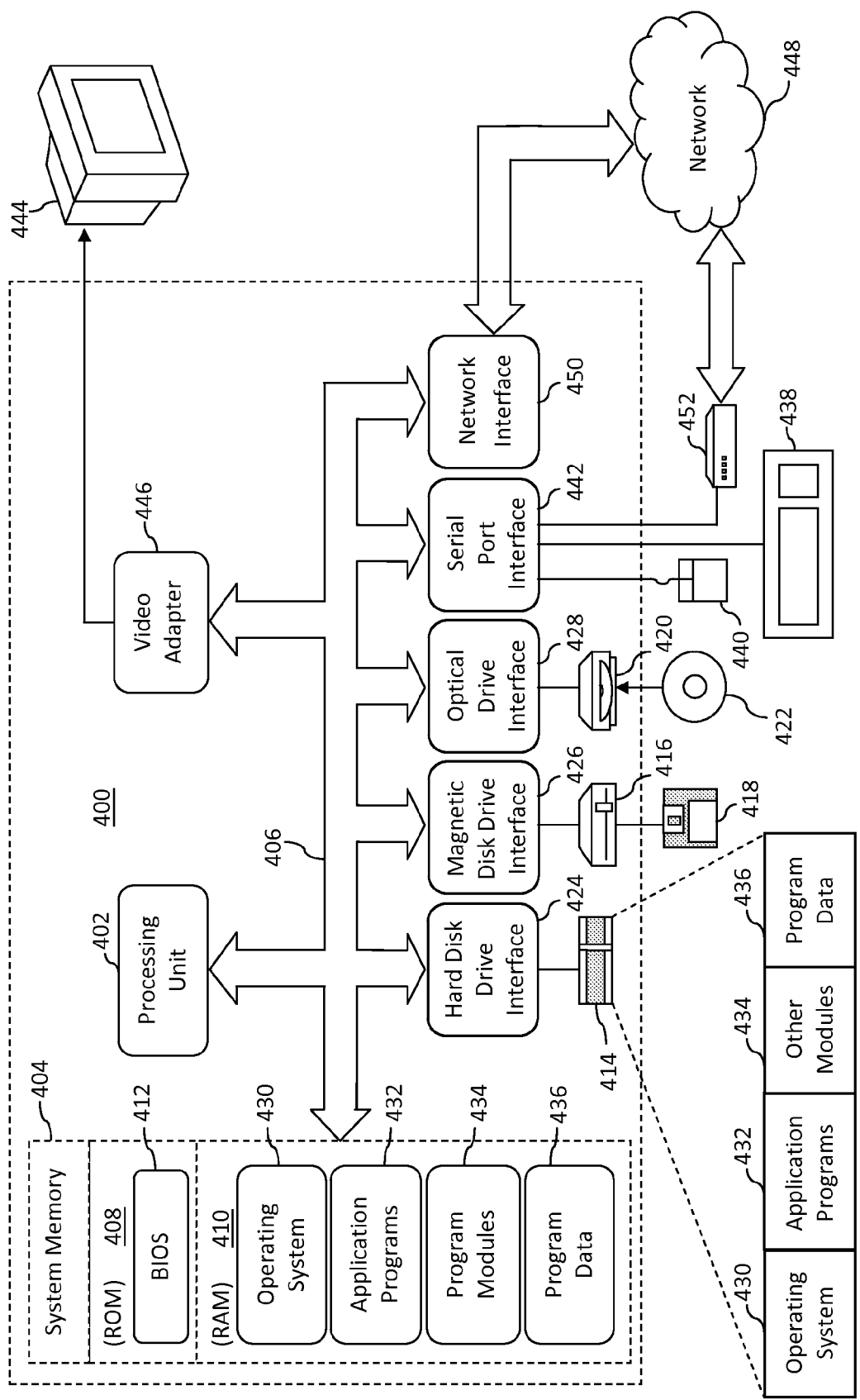

FIG. 4 depicts an example computer 400 in which embodiments may be implemented. Device 100 shown in FIG. 1 (or any one or more subcomponents thereof shown in FIG. 3) may be implemented using computer 400, including one or more features of computer 400 and/or alternative features.

Computer 400 may be a general-purpose computing device in the form of a conventional personal computer, a mobile computer, or a workstation, for example, or computer 400 may be a special purpose computing device. The description of computer 400 provided herein is provided for purposes of illustration, and is not intended to be limiting. Embodiments may be implemented in further types of computer systems, as would be known to persons skilled in the relevant art(s).

As shown in FIG. 4, computer 400 includes a processing unit 402, a system memory 404, and a bus 406 that couples various system components including system memory 404 to processing unit 402. Bus 406 represents one or more of any of several types of bus structures, including a memory bus or memory controller, a peripheral bus, an accelerated graphics port, and a processor or local bus using any of a variety of bus architectures. System memory 404 includes read only memory (ROM) 408 and random access memory (RAM) 410. A basic input/output system 412 (BIOS) is stored in ROM 408.

Computer 400 also has one or more of the following drives: a hard disk drive 414 for reading from and writing to a hard disk, a magnetic disk drive 416 for reading from or writing to a removable magnetic disk 418, and an optical disk drive 420 for reading from or writing to a removable optical disk 122 such as a CD ROM, DVD ROM, or other optical media. Hard disk drive 414, magnetic disk drive 416, and optical disk drive 420 are connected to bus 406 by a hard disk drive interface 424, a magnetic disk drive interface 426, and an optical drive interface 428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 430, one or more application programs 432, other program modules 434, and program data 436. Application programs 432 or program modules 434 may include, for example, computer program logic for implementing anti-malware logic 104, selective scanner 110, infection determination logic 302, update identifier logic 304, selection logic 306, object determination logic 308, incrementing logic 310, association logic 312, access determination logic 314, intercepting logic 316, log identification logic 318, comparison logic 320, scanning logic 322, disinfecting logic 324, allowance logic 326, error determination logic 328, loader determination logic 330, signature logic 332, flowchart 200 (including any step of flowchart 200), and/or flowchart 500 (including any step of flowchart 500), as described herein.

A user may enter commands and information into the computer 400 through input devices such as keyboard 438 and pointing device 440. Other input devices (not shown) may include a microphone, joystick, game pad, satellite dish, scanner, or the like. These and other input devices are often connected to the processing unit 402 through a serial port interface 442 that is coupled to bus 406, but may be connected by other interfaces, such as a parallel port, game port, or a universal serial bus (USB).

A display device 444 (e.g., a monitor) is also connected to bus 406 via an interface, such as a video adapter 446. In addition to display device 444, computer 400 may include other peripheral output devices (not shown) such as speakers and printers.

Computer 400 is connected to a network 448 (e.g., the Internet) through a network interface or adapter 450, a modem 452, or other means for establishing communications over the network. Modem 452, which may be internal or external, is connected to bus 406 via serial port interface 442.

As used herein, the terms "computer program medium" and "computer-readable medium" are used to generally refer to media such as the hard disk associated with hard disk drive 414, removable magnetic disk 418, removable optical disk 422, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 432 and other program modules 434) may be stored on the hard disk, magnetic disk, optical disk, ROM, or RAM. Such computer programs may also be received via network interface 450 or serial port interface 442. Such computer programs, when executed or loaded by an application, enable computer 400 to implement features of embodiments discussed herein. Accordingly, such computer programs represent controllers of the computer 400.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
   determining that a plurality of objects is not infected by malware;
   selecting a value of an update identifier in an update log that is associated with the plurality of objects to be a reference value in response to determining that the plurality of objects is not infected by malware, the update identifier indicating a number of updates that occur with respect to the plurality of objects;
   incrementing the value of the update identifier for each update that occurs with respect to an object of the plurality of objects to provide a respective incremented value;
   determining that access to a designated object that is included in the plurality of objects is initiated;
   determining whether the incremented value that is associated with the designated object is greater than the reference value;
   allowing operations to be executed with respect to the designated object in absence of scanning the designated object for infection by malware in response to determining that the incremental value that is associated with the designated object is not greater than the reference value;
   determining that a determination that the plurality of objects is not infected by malware is erroneous; and
   disregarding the reference value such that operations are not allowed to be executed with respect to objects in the plurality of objects in absence of scanning those objects for infection by malware in response to determining that the determination that the plurality of objects is not infected by malware is erroneous.

2. The method of claim 1, further comprising:
   determining whether a log identifier that is associated with the designated object and a reference identifier that is associated with the update log are same;
   wherein allowing the operations to be executed with respect to the designated object comprises:
      allowing the operations to be executed with respect to the designated object in absence of scanning the designated object for infection by malware further in response to determining that the log identifier that is associated with the designated object and the reference identifier are the same.

3. The method of claim 1, wherein incrementing the value of the update identifier for each update that occurs with respect to an object of the plurality of objects comprises:
   incrementing the value of the update identifier in response to an object being added to the plurality of objects.

4. The method of claim 1, wherein incrementing the value of the update identifier for each update that occurs with respect to an object of the plurality of objects comprises:
   incrementing the value of the update identifier in response to an object that is included in the plurality of objects being modified.

5. The method of claim 1, wherein determining that access to the designated object is initiated comprises:
   determining that an attempt is made to open the designated file.

6. The method of claim 1, wherein determining that access to the designated object is initiated comprises:
   determining that an attempt is made to save the designated file.

7. The method of claim 1, further comprising:
   determining that access to a second designated object that is included in the plurality of objects is initiated;
   determining whether the incremented value that is associated with the second designated object is greater than the reference value; and
   scanning the second designated object for infection by malware in response to determining that the incremental value that is associated with the second designated object is greater than the reference value.

8. The method of claim 1, further comprising:
determining whether a log identifier that is associated with a second designated object and a reference identifier that is associated with the update log are same; and
scanning the second designated object for infection by malware in response to determining that the log identifier that is associated with the second designated object and the reference identifier are not the same.

9. The method of claim 1, further comprising:
determining that an original equipment manufacturer or an anti-malware vendor loads the plurality of objects on a machine; and
generating a signature regarding the plurality of objects that indicates that operations are not to be allowed on instances of the plurality of objects that are loaded on machines by the original equipment manufacturer or the anti-malware vendor in absence of scanning the instances for infection by malware.

10. A system comprising:
infection determination logic configured to determine whether a plurality of objects is infected by malware;
selection logic configured to select a value of an update identifier in an update log that is associated with the plurality of objects to be a reference value in response to a determination that the plurality of objects is not infected by malware, the update identifier indicating a number of updates that occur with respect to the plurality of objects;
incrementing logic configured to increment the value of the update identifier for each update that occurs with respect to an object of the plurality of objects to provide a respective incremented value;
access determination logic configured to determine whether access to a designated object that is included in the plurality of objects is initiated;
comparison logic configured to determine whether the incremented value that is associated with the designated object is greater than the reference value;
allowance logic configured to allow operations to be executed with respect to the designated object in absence of scanning the designated object for infection by malware in response to a determination that access to the designated object is initiated and further in response to a determination that the incremental value that is associated with the designated object is not greater than the reference value; and
error determination logic configured to determine whether a determination that the plurality of objects is not infected by malware is erroneous,
the comparison logic further configured to disregard the reference value such that operations are not allowed to be executed with respect to objects in the plurality of objects in absence of scanning those objects for infection by malware in response to a determination that the determination that the plurality of objects is not infected by malware is erroneous.

11. The system of claim 10, wherein the comparison logic is further configured to determine whether a log identifier that is associated with the designated object and a reference identifier that is associated with the update log are same; and
wherein the allowance logic is configured to allow the operations to be executed with respect to the designated object in absence of scanning the designated object for infection by malware further in response to a determination that the log identifier that is associated with the designated object and the reference identifier are the same.

12. The system of claim 10, wherein the incrementing logic is configured to increment the value of the update identifier in response to an object being added to the plurality of objects.

13. The system of claim 10, wherein the incrementing logic is configured to increment the value of the update identifier in response to an object that is included in the plurality of objects being modified.

14. The system of claim 10, wherein the determination that access to the designated object is initiated includes a determination that an attempt is made to open the designated file.

15. The system of claim 10, wherein the determination that access to the designated object is initiated includes a determination that an attempt is made to save the designated file.

16. The system of claim 10, further comprising:
scanning logic configured to scan the designated object for infection by malware in response to a determination that access to the designated object is initiated and further in response to a determination that the incremental value that is associated with the designated object is greater than the reference value.

17. The system of claim 10, wherein the comparison logic is further configured to determine whether a log identifier that is associated with the designated object and a reference identifier that is associated with the update log are same;
wherein the allowance logic is configured to allow the operations to be executed with respect to the designated object in absence of scanning the designated object for infection by malware further in response to a determination that the log identifier that is associated with the designated object and the reference identifier are the same; and
wherein the system further comprises:
scanning logic configured to scan the designated object for infection by malware in response to a determination that access to the designated object is initiated and further in response to at least one of a first condition or a second condition being true, the first condition being that the incremental value that is associated with the designated object is greater than the reference value, the second condition being that the log identifier that is associated with the designated object and the reference identifier are not the same.

18. A computer program product device comprising a computer-readable medium having computer program logic recorded thereon for enabling a processor-based system to selectively scan objects based on metadata, the computer program product device comprising:
a first program logic module for enabling the processor-based system to determine whether a plurality of objects is infected by malware;
a second program logic module for enabling the processor-based system to select a value of an update identifier in an update log that is associated with the plurality of objects to be a reference value in response to a determination that the plurality of objects is not infected by malware, the update identifier indicating a number of updates that occur with respect to the plurality of objects;
a third program logic module for enabling the processor-based system to increment the value of the update identifier for each update that occurs with respect to an object of the plurality of objects to provide a respective incremented value;
a fourth program logic module for enabling the processor-based system to determine whether access to a designated object that is included in the plurality of objects is initiated;

a fifth program logic module for enabling the processor-based system to determine whether the incremented value that is associated with the designated object is greater than the reference value;

a sixth program logic module for enabling the processor-based system to determine whether a log identifier that is associated with the designated object and a reference identifier that is associated with the update log are same;

a seventh program logic module for enabling the processor-based system to allow operations to be executed with respect to the designated object in absence of scanning the designated object for infection by malware in response to a determination that access to the designated object is initiated and further in response to a determination that the incremental value that is associated with the designated object is not greater than the reference value and further in response to a determination that the log identifier that is associated with the designated object and the reference identifier are the same;

an eighth program logic module for enabling the processor-based system to determine whether a determination that the plurality of objects is not infected by malware is erroneous; and a ninth program logic module for enabling the processor-based system to disregard the reference value such that operations are not allowed to be executed with respect to objects in the plurality of objects in absence of scanning those objects for infection by malware in response to a determination that the determination that the plurality of objects is not infected by malware is erroneous.

19. The computer program product device of claim 18, further comprising:

a tenth program logic module for enabling the processor-based system to scan the designated object for infection by malware in response to a determination that access to the designated object is initiated and further in response to at least one of a first condition or a second condition being true, the first condition being that the incremental value that is associated with the designated object is greater than the reference value, the second condition being that the log identifier that is associated with the designated object and the reference identifier are not the same.

20. The computer program product device of claim 18, wherein the third program logic module comprises:

logic for enabling the processor-based system to increment the value of the update identifier in response to an object being added to the plurality of objects.

* * * * *